2,987,520
CERTAIN 4(NITROALKYL)-3,5-DINITRO-1,2,4-TRIAZOLES

Darrell V. Sickman, Washington, D.C., assignor, by mesne assignments, to the United States of America as represented by the Secretary of the Navy
No Drawing. Filed July 11, 1956, Ser. No. 597,312
10 Claims. (Cl. 260—308)

The invention described herein may be manufactured and used by or for the Government of the United States of America for governmental purposes without the payment of any royalties thereon or therefor.

This invention relates to new and useful chemical compounds and to methods of preparing the same. More particularly the invention relates to 4-(2-nitroalkyl)-3,5-dinitro-1,2,4-triazoles and 4-(2-nitroaro-alkyl)-3,5-dinitro-1,2,4-triazoles and to a process for the preparation of these compounds.

These compounds prepared by the process of the invention have the following general formula:

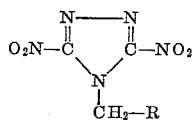

where R is a nitrosubstituted alkyl or aromatic-alkyl group.

Compounds of the type described contain an unusually large proportion of oxygen in their structure and have been found to be useful as high explosives. The new compound 4-(2-nitroethyl)-3,5-dinitro-1,2,4-triazole has a sensitivity comparable to that of tetryl but is much more stable to heat. This compound is, therefore, used as a substitute for tetryl in many explosive compositions with improved results. The high proportion of oxygen locked into their structure makes these compounds desirable for use in underwater explosives. They are mixed with aluminum to give underwater explosives of greatly improved performance. The high nitrogen content of the compounds which are the subject of this invention makes them useful as an ingredient in propellant compositions to increase the burning rate and gas volume. These compounds are also used as additives to diesel fuels to increase the ignitability of those fuels.

In carrying out the process of the invention a 2-nitroalkene is dissolved in ether and added directly to an ether solution of 3,5-dinitro-1,2,4-triazole. Nitroethylene adds readily at room temperatures in accordance with the following equation:

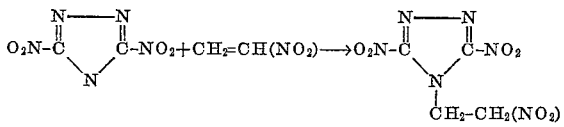

It is, therefore, an object of the present invention to provide a new and useful process for the preparation of 4-(2-nitroalkyl)-3,5-dinitro-1,2,4-triazoles and 4-(2-nitroaro-alkyl)-3,5-dinitro-1,2,4-triazoles.

Another object is to provide a class of new and useful compounds having the general formulas 4-(2-nitroalkyl)-3,5-dinitro-1,2,4-triazole and 4-(2-nitroaro-alkyl)-3,5-dinitro-1,2,4-triazole.

Other objects and the attendant advantages of the invention will be apparent to those skilled in the art as the invention is disclosed in the following detailed description.

Higher nitroalkenes and substituted nitroalkenes may require heating for a short period to initiate the addition. After the reaction is completed the ether solvent is then evaporated and the product crystallized out and purified.

The 2-nitroalkenes may be prepared in any desired manner depending on the end product desired. The nitroalkenes may advantageously be obtained by dehydration of the corresponding alcohol. However, they may also be prepared by any of several well-known methods.

The 3,5-dinitro-1,2,4-triazole may be prepared as described in assignee's copending application Serial No. 516,339, filed June 17, 1955, now abandoned.

Any suitable solvent may be employed for the reaction. Ethyl ether has been found very satisfactory for this purpose.

The invention will now be illustrated in greater detail by means of the following specific examples in which representative 4-(2-nitroalkyl)-3,5-dinitro-1,2,4-triazoles and 4-(2-nitroaro-alkyl)-3,5-dinitro-1,2,4-triazoles are prepared. These examples are given merely by way of illustration and are not to be considered as limiting the invention in any manner.

EXAMPLE I

A solution of crude nitroethylene (prepared from 3 ml. of nitroethanol by dehydration with potassium bisulfate) in 40 ml. ether was added to 1.5 g. of 3,5-dinitro-1,2,4-triazole in 10 ml. of ether. The solution was allowed to stand overnight at room temperature during which time crystals were deposited. The ether layer was evaporated to yield more crystals. The combined solids were washed with methanol and recrystallized from ethanol to yield 1.3 g. of 4-(-2-nitroethyl)-3,5-dinitro-1,2,4-triazole. This represented 57% of the theoretical yield. Upon analysis: Calculated for $C_4H_4N_6O_6$: C, 20.7; H, 1.7; N, 36.2. Found: C, 21.4; H, 1.90; N, 36.26.

EXAMPLE II

To an ether solution of 2-nitropropene (prepared by dehydration of 2 g. of 2-nitropropanol-1) was added 0.5 g. of 3,5-dinitrol-1,2,4-triazole. Since on standing no crystallization occurred, the solution was refluxed for three hours. Evaporation of a small amount of this ether solution yielded only an oil which could not be induced to crystallize. The ether was removed on a steam bath and the residue heated on a steam bath for one hour. The residue was extracted with hot ether. After evaporation of the ether, the residue was recrystallized from isopropyl alcohol yielding 0.2 g. of 4-(2-nitropropyl)-3,5-dinitro-1,2,4-triazole. Upon analysis: Calculated for $C_5H_6N_6O_6$: C, 24.4; H, 2.4; N, 34.2. Found: C, 28.13; H, 2.51; N, 32.63.

EXAMPLE III

To an ether solution of beta nitrostyrene was added an ether solution of 3,5-dinitrol-1,2,4-triazole. The reaction was catalyzed with potassium hydroxide and the product 4-(2-nitro-2-phenylethyl)-3,5-dinitro-1,2,4-triazole was separated. Upon analysis: Calculated for $C_{10}H_8O_6N_6$: N, 27.27. Found: N, 24.15, 23.95.

The compounds of the present invention are crystalline solids at room temperatures. They are characterized by high melting points, thermal stability and are relatively insensitive to impact. These characteristics make them useful as high explosives. The new compound 4-(2-nitroethyl)-3,5-dinitro-1,2,4-triazole which has a melting point of 147° C., an ignition temperature of 274° C. and a crystal density of 1.76 is thermally stable as indicated by a gas evolution of 1.41 cc. of gas per gram in 48 hours at 100° C. and may be used as a substitute in explosive compositions for tetryl which has approximately the same impact sensitivity.

Table I lists some of the compounds of the invention and some of their physical characteristics.

Table I

|  | M.P., °C. | Crystal Density |
|---|---|---|
| $C_4H_4N_6O_6$ | 146–7 | 1.76 |
| $C_5H_6N_6O_6$ | 142–3 | |
| $C_{10}H_8N_6O_6$ | 137–9 | |

From the foregoing detailed description it may be seen that a new and useful class of chemical compounds has been disclosed as well as a method of preparing.

What is claimed as new and desired to be secured by Letters Patent of the United States is:

1. The process for the preparation of new compounds comprising reacting 3,5-dinitro-1,2,4-triazole and a compound selected from the group consisting of nitroethylene, 2-nitropropene and beta nitrostyrene.

2. The process for the preparation of new compounds comprising reacting in the liquid phase 3,5-dinitro-1,2,4-triazole and a compound selected from the group consisting of nitroethylene, 2-nitropropene and beta nitrostyrene.

3. The process for the preparation of new compounds comprising reacting in ether solution 3,5-dinitro-1,2,4-triazole and a compound selected from the group consisting of nitroethylene, 2-nitropropene and beta nitrostyrene.

4. A new chemical compound selected from the group consisting of 4-(2-nitroethyl)-3,5-dinitro-1,2,4-triazole, 4-(2-nitropropyl)-3,5-dinitro-1,2,4-triazole and 4-(2-nitro-2-phenylethyl)-3,5-dinitro-1,2-4-triazole.

5. The process for preparing 4-(2-nitroethyl)-3,5-dinitro-1,2,4-triazole comprising reacting 3,5-dinitro-1,2,4-triazole with nitroethylene.

6. The new chemical compound 4-(2-nitroethyl)-3,5-dinitro-1,2,4-triazole.

7. The process for preparing 4-(2-nitropropyl)-3,5-dinitro-1,2,4-triazole comprising reacting 3,5-dinitro-1,2,4-triazole with 2-nitropropene.

8. The new chemical compound 4-(2-nitropropyl)-3,5-dinitro-1,2,4-triazole.

9. The process for preparing 4-(2-nitro-2-phenylethyl)-3,5-dinitro-1,2,4-triazole comprising reacting 3,5-dinitro-1,2,4-triazole and beta nitrostyrene.

10. The new chemical compound 4-(2-nitro-2-phenylethyl)-3,5-dinitro-1,2,4-triazole.

No references cited.